(12) United States Patent
Matsumura et al.

(10) Patent No.: US 11,600,403 B2
(45) Date of Patent: *Mar. 7, 2023

(54) CABLE

(71) Applicant: SUMITOMO ELECTRIC INDUSTRIES, LTD., Osaka (JP)

(72) Inventors: Yutaka Matsumura, Osaka (JP); Shigeyuki Tanaka, Osaka (JP); Taro Fujita, Osaka (JP); Takaya Kohori, Tochigi (JP); Masayuki Ishikawa, Tochigi (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 328 days.

This patent is subject to a terminal disclaimer.

(21) Appl. No.: 16/753,421

(22) PCT Filed: Aug. 6, 2018

(86) PCT No.: PCT/JP2018/029450
§ 371 (c)(1),
(2) Date: Apr. 3, 2020

(87) PCT Pub. No.: WO2019/087505
PCT Pub. Date: May 9, 2019

(65) Prior Publication Data
US 2020/0258658 A1    Aug. 13, 2020

(30) Foreign Application Priority Data
Oct. 31, 2017  (JP) .............................. JP2017-211177

(51) Int. Cl.
*H01B 11/04* (2006.01)
*H01B 7/18* (2006.01)
(Continued)

(52) U.S. Cl.
CPC .......... *H01B 7/1875* (2013.01); *B60T 11/046* (2013.01); *H01B 3/302* (2013.01); *H01B 3/427* (2013.01)

(58) Field of Classification Search
CPC .............................. H01B 11/04; H01B 7/0208
See application file for complete search history.

(56) References Cited

U.S. PATENT DOCUMENTS 5,238,767 A      8/1993  Horiie
10,224,130 B2 *  3/2019  Tanaka ................... H01B 3/307
(Continued)

FOREIGN PATENT DOCUMENTS

CN    103739927    *  4/2014
JP    H06-212073      8/1994
(Continued)

OTHER PUBLICATIONS

Specification, Claims, Abstract and Drawings of the U.S. Appl. No. 15/740,469, filed Dec. 28, 2017.
(Continued)

*Primary Examiner* — Chau N Nguyen
(74) *Attorney, Agent, or Firm* — IPUSA, PLLC

(57) ABSTRACT

The cable according to one embodiment of the invention comprises: one or a plurality of core members, each having a conductor and an insulation cover material covering the conductor; and a sheath layer covering the one or the plurality of core members. The sheath layer comprises an inner sheath layer, and an outer sheath layer covering the inner sheath layer. The inner sheath layer comprises a crosslinked very low density polyethylene. The main component of the outer sheath layer is polyurethane. Relative to 100 parts by mass of resin component in the inner sheath layer, the very low density polyethylene content is between 20 parts by mass and 100 parts by mass inclusive. The elastic (Continued)

modulus of the inner sheath layer at 25° C. is between 5 MPa and 30 MPa inclusive.

9 Claims, 1 Drawing Sheet

(51) Int. Cl.
    *B60T 11/04*    (2006.01)
    *H01B 3/30*    (2006.01)
    *H01B 3/42*    (2006.01)

(56) References Cited

U.S. PATENT DOCUMENTS

| | | |
|---|---|---|
| 2012/0292077 A1 | 11/2012 | Sugita et al. |
| 2015/0144375 A1* | 5/2015 | Hashimoto ............ H01B 1/026 174/113 R |
| 2016/0300641 A1 | 10/2016 | Miyama et al. |
| 2017/0309373 A1 | 10/2017 | Tanaka et al. |

FOREIGN PATENT DOCUMENTS

| | | | |
|---|---|---|---|
| JP | 2007-005137 | * | 1/2007 |
| JP | 2012-149163 | | 8/2012 |
| JP | 2012-241129 | | 12/2012 |
| JP | 2014-065809 | | 4/2014 |
| JP | 2016-050272 | | 4/2016 |
| JP | 2016-201220 | | 12/2016 |
| WO | WO 2009-008537 | * | 1/2009 |
| WO | 2017/056278 | | 4/2017 |

OTHER PUBLICATIONS

Office Action dated May 2, 2018 with respect to the related U.S. Appl. No. 15/740,469.

Notice of Allowance dated Oct. 29, 2018 with respect to the related U.S. Appl. No. 15/740,469.

\* cited by examiner

CABLE

TECHNICAL FIELD

The present disclosure relates to a cable.

BACKGROUND ART

Cables such as electromechanical parking brake cables and wheel speed sensor cables include cables in which a plurality of electric wires covered with an insulating coating layer, such as polyethylene or polyvinyl chloride, are bundled around a conductor, and the outer periphery thereof is covered with a sheath layer. Because such cables are subject to heat radiation from engines, brake disks and the like, the cables are required to have heat resistance in addition to toughness and flexibility.

In response to this heat resistance requirement, a cable has been proposed in which a sheath layer is formed by coating an electric wire with a heat-resistant polyurethane elastomer composition containing a polyurethane elastomer, a halogenated flame retardant other than a polydiphenyl ether, and a carbodiimide compound, and irradiating the heat-resistant polyurethane elastomer composition with an electron beam (see Japanese Laid-Open Patent Application Publication No. 6-212073). In the conventional cable described above, the electron beam irradiation improves the heat resistance by crosslinking the polyurethane in the sheath layer.

PRIOR ART DOCUMENTS

Patent Documents

Patent Document 1: Japanese Laid-Open Patent Application Publication No. 6-212073

SUMMARY OF THE INVENTION

A cable according to one embodiment of the present disclosure includes one or more core members including a conductor and an insulating coating layer covering the conductor; and a sheath layer covering the one or more core members, wherein the sheath layer includes an inner sheath layer and an outer sheath layer covering the inner sheath layer, wherein the inner sheath layer contains a very low density polyethylene that is subject to crosslinking, wherein the outer sheath layer contains polyurethane as a main component, wherein a content of the very low density polyethylene in 100 parts by mass of a resin component of the inner sheath layer is 20 parts by mass or more and 100 parts by mass or less, and wherein an elastic modulus of the inner sheath layer at 25 degrees C. is 5 MPa or more and 30 MPa or less.

MODE OF CARRYING OUT THE INVENTION

Figure 1:
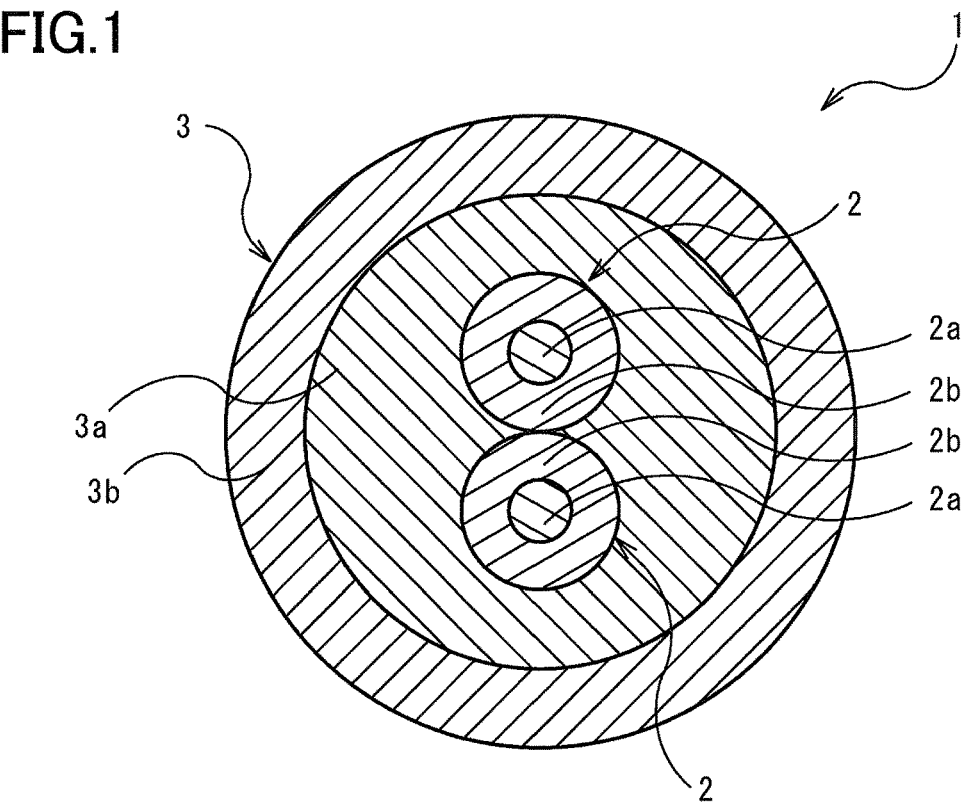
FIG. 1 is a schematic cross-sectional view of a cable of one embodiment of the present disclosure.

Problems to be Solved by the Disclosure

Because the wire used for electromechanical parking brakes, wheel speed sensors and the like has a large diameter, the outer diameter of the cable formed by bundling the wire and covering the bundled wire with a sheath layer is also large. If the outer diameter of the cable is large, the strength required for the sheath layer located around the outer periphery of the cable increases because the stress increases when the cable is bent. Therefore, the cable described in the aforementioned publication requires the thickness of the sheath layer to be increased in order to increase the strength of the sheath layer. However, increasing the thickness of the sheath layer is likely to decrease the flexibility of the cable. That is, in the conventional cable described in the aforementioned publication, the improvement of the strength of the sheath layer is a traded-off for the flexibility of the cable.

The present disclosure is based on the circumstances described above and is intended to provide a cable that is sufficiently strong, flexible, and heat resistant.

[Effect of the Disclosure]

The cable of the present disclosure is sufficiently strong, flexible and heat resistant. Accordingly, the cable of the present disclosure can be suitably employed as a cable used for electrical wiring such as electromechanical parking brakes and wheel speed sensors.

Description of Embodiments of the Present Disclosure

A cable according to one embodiment of the present disclosure includes one or more core members including a conductor and an insulating coating layer covering the conductor; and a sheath layer covering the one or more core members, wherein the sheath layer includes an inner sheath layer and an outer sheath layer covering the inner sheath layer, wherein the inner sheath layer contains a very low density polyethylene that is subject to crosslinking, wherein the outer sheath layer contains polyurethane as a main component, wherein a content of the very low density polyethylene in 100 parts by mass of a resin component of the inner sheath layer is 20 parts by mass or more and 100 parts by mass or less, and wherein an elastic modulus of the inner sheath layer at 25 degrees C. is 5 MPa or more and 30 MPa or less.

The cable is highly heat resistant because the inner sheath layer contains a crosslinked very low density polyethylene. In addition, the cable is highly flexible because the content of the very low density polyethylene in 100 parts by mass of the resin component of the inner sheath layer is within the above-described range. Also, the cable has polyurethane as a main component of the outer sheath layer. Because polyurethane and the very low density polyethylene are easily bonded with each other and the adhesion strength between the inner sheath layer and the outer sheath layer is readily secured, the inner sheath layer and the outer sheath layer of the cable are difficult to peel off from each other. Moreover, because using polyurethane as the main component increases the mechanical strength of the cable, the cable is sufficiently strong. In addition, the cable can be sufficiently flexible and heat resistant because an elastic modulus at 25 degrees C. of the inner sheath layer is within the aforementioned range.

The elastic modulus of the inner sheath layer is preferably not less than 0.1 MPa and not more than 0.8 MPa at 150 degrees C. As described above, by setting the elastic modulus at 150 degrees C. of the inner sheath layer within the above-described range, the heat resistance of the cable can be improved.

The specific gravity of the very low density polyethylene is preferably 0.90 or less. As described above, by setting the specific gravity of the very low density polyethylene to the upper limit or less, the flexibility of the cable can be increased.

The crosslinking is preferably chemical crosslinking, particularly silane crosslinking. The content of silicon atoms in the very low density polyethylene is preferably 0.05 mass % or more and 10 mass % or less. Thus, because the crosslinking is the silane crosslinking and the silicon atom content in the very low density polyethylene is within the above-described range, the very low density polyethylene has a network polymer structure in which the silane crosslinking group is crosslinked by contacting with moisture. Because the inner sheath layer is made more heat resistant by this silane crosslinked polymeric structure, at least the inner sheath layer in the cable does not need to be crosslinked using an electron beam. Thus, the cost of electron beam irradiation can be reduced because the cable requires no electron beam apparatus or only a low power electron beam apparatus capable of crosslinking the outer sheath layer in manufacturing. Accordingly, the manufacturing cost of the cable is relatively low even when the sheath layer is thick. Because the content of the silicon atoms constituting the silane crosslinking is not more than the above-described upper limit, the hardening of the inner sheath layer by the silane crosslinking group is prevented, and the cable has sufficient flexibility.

The content of silicon atoms in the inner sheath layer is preferably not less than 0.01 mass % and not more than 10 mass %. Thus, the content of silicon atoms in the inner sheath layer is within the above-described range, thereby increasing the heat resistance and the flexibility.

The inner sheath layer may further contain a non-crosslinked resin. Further inclusion of a relatively inexpensive non-crosslinked resin in the inner sheath layer can farther reduce the manufacturing cost of the cable.

The non-crosslinked resin may be a copolymer of ethylene with a vinyl monomer containing an ester bond. The copolymer is relatively inexpensive and highly adhesive to polyurethane, which is a major component of the outer sheath layer. Accordingly, the above-described non-crosslinked resin can be copolymerized to further reduce the manufacturing cost of the cable and can further make it difficult for the outer sheath layer to peel from the inner sheath layer.

The polyurethane in the outer sheath layer may be allophanate crosslinked polyurethane. By using the allophanate crosslinked polyurethane for the polyurethane of the outer sheath layer, the strength of the outer sheath layer can be further increased, and the strength of the cable can be increased. Also, because crosslinking using an electron beam does not be performed on the outer sheath layer, an electron beam apparatus can be made unnecessary, and the manufacturing cost of the cable can be further reduced.

The cable may be preferably used for an electromechanical parking brake. The cable is suitable for the electromechanical parking brake in automobiles because the cable is sufficiently strong, flexible and heat resistant.

Preferably, the average outer diameter of the inner sheath layer is not less than 3 mm but not more than 12 mm. As described above, by setting the average outer diameter of the inner sheath layer within the above-described range, the flexibility of the cable can be ensured, and the heat resistance can be improved.

The average thickness of the outer sheath layer is preferably 0.2 mm or more and 0.7 mm or less. Thus, by setting the average thickness of the outer sheath layer within the above-described range, both the strength and flexibility of the cable can be ensured.

The content of polyurethane in the outer sheath layer is preferably 50 parts by mass or more and 100 parts by mass or less. As described above, by setting the amount of polyurethane in the outer sheath layer within the above-described range, the bonding strength between the inner sheath layer and the outer sheath layer can be ensured.

Preferably, the bonding strength of the inner sheath layer and the outer sheath layer by 90 degree peel test is 2.5 N/cm or more. As described above, by setting the adhesion strength of the inner sheath layer and the outer sheath layer to the above-mentioned lower limit or more, peeling off of the inner sheath layer from the outer sheath layer can be prevented when the cable is used.

Here, the "main ingredient" means an ingredient having the highest content, for example, an ingredient having a content of 50% by mass or more, preferably 90% or more. The "modulus of elasticity" is the value of the modulus of elasticity stored as measured by dynamic viscoelastometry. The "content of silicon atoms" is the value measured by EDX analysis at an accelerating voltage of 15 kV and an analytical area of 0.1*0.1 mm. The "specific gravity" means the mass-to-water ratio of 4 degrees C. in the same volume. The "adhesion strength by 90 degree peel test" is the value measured in accordance with the 90 degree peel test described in JIS-K-6854 (1999).

Details of Embodiments of the Present Disclosure

Hereinafter, the cable according to the embodiments of the present disclosure will be described in detail with reference to the drawings.

First Embodiment

The cable 1 shown in FIG. 1 includes two core members 2 and a sheath layer 3 covering the two core members 2. The cable 1 can be suitably used for an electromechanical parking brake used for electrical wiring of an automobile, a wheel speed sensor and the like.

<Core Members>

Each of the two core members 2 is an electric wire that transmits an electrical signal and has a conductor 2a and an insulating coating layer 2b covering the conductor 2a.

The two core members 2 are provided so that their outer peripheries contact with each other along the lengthwise direction. In addition, the two core members 2 may be arranged in parallel, but preferably are arranged in a twisted fashion. As described above, twisting the two core members 2 can increase the flexibility of the cable 1.

The conductor 2a of the core member 2 is configured as a single wire or a strand wire. Further, the element wire of the above-described conductor 2a includes a soft copper wire, such as a copper wire, a tin-plated soft copper wire, a copper alloy wire, an aluminum wire, an aluminum alloy wire and the like, although the element wire of the above-described conductor 2a is not particularly limited as long as the element wire can transmit electricity.

The average outer diameter of the above-described conductor 2a is appropriately determined by the resistance value and the like required for the core member 2, but the lower limit of the average outer diameter of the above-described conductor 2a is preferably 0.5 mm, and more preferably 0.7 mm. Meanwhile, the upper limit of the average outer diameter of the above-described conductor 2a is preferably 3 mm, and more preferably 2.6 mm. If the average outer diameter of the conductor 2a is less than the lower limit, the resistance value of the core member 2 may be too high, and the electrical signal may not be sufficiently transmitted. Conversely, if the average outer diameter of the conductor 2a exceeds the upper limit, because the core member 2 is unnecessarily thick, the flexibility of the cable 1 may be reduced. The "average outer diameter" of a conductor means the value obtained by averaging the diameter of a circle having an area equivalent to the cross section of the conductor in the lengthwise direction.

As the main component of the insulating coating layer 2b of the core member 2, resin such as polyethylene or polyurethane may be used, although the main component is not particularly limited as long as the insulation property is secured. In addition, the resin may be crosslinked by electron beam irradiation. Crosslinking of the resin improves the heat resistance of the core member 2.

The lower limit of the average thickness of the insulating coating layer 2b is preferably 0.15 mm and more preferably 0.2 mm. Meanwhile, the upper limit of the average thickness of the insulating coating layer 2b is preferably 0.8 mm and more preferably 0.7 mm. If the average thickness of the insulating coating layer 2b is less than the lower limit, the insulating property of the core member 2 is insufficient, and there is a risk that the core member 2 may short-circuit with the adjacent core member 2. Conversely, if the average thickness of the insulating coating layer 2b exceeds the above-described upper limit, because the core member 2 is unnecessarily thick, the flexibility of the cable 1 may decrease.

The insulating coating layer 2b may optionally contain an additive such as a heat-resistant antioxidant or a flame retardant, if necessary. Examples of the heat-resistant antioxidant include a phenol-based antioxidant such as tetrakis-[methylene-3-(3', 5'-di-tert-butyl-4'-hydroxyphenyl)propionate]methane, octadecyl-3-(3,5-di-tert-butyl-4-hydroxyphenyl)propionate, and an amine-based antioxidant such as 4,4'-dioctyldiphenylamine, N-phenyl-N'-1,3-dimethylbutyl-p-phenylenediamine. Examples of the flame retardant include a brominated organic compound, antimony trioxide, magnesium hydroxide, aluminum hydroxide, calcium hydroxide and the like.

The lower limit of the average outer diameter of the core member 2 is preferably 1 mm and more preferably 1.3 mm. On the other hand, the upper limit of the average outer diameter of the core member 2 is preferably 4 mm and more preferably 3.8 mm. If the average outer diameter of the core member 2 is less than the lower limit, the average outer diameter of the conductor 2a or the average thickness of the insulating coating layer 2b is insufficient, and the conductivity of the core member 2 is liable to be insufficient or the insulating property is liable to be insufficient. Conversely, if the average outer diameter of the core member 2 exceeds the upper limit, the core member 2 is unnecessarily thick, and the flexibility of the cable 1 may decrease.

<Sheath Layer>

The sheath layer 3 comprises an inner sheath layer 3a covering the two core members 2 and an outer sheath layer 3b covering the inner sheath layer 3a.

(Inner Sheath Layer)

The inner sheath layer 3a contains a crosslinked very low density polyethylene (VLDPE; Very Low Density Polyethylene). The above-described crosslinking may be any of chemical crosslinking, radiation crosslinking, such as electron beam crosslinking, or thermal crosslinking. However, chemical crosslinking is preferable for convenience, and silane crosslinking is particularly preferred. Also, crosslinking by ionizing radiation can be preferably used when an ionizing radiation apparatus is available. When the above-described crosslinking is electron beam crosslinking, the radiation dose of the electron beam may be, for example, 60 kGy or more and 480 kGy or less.

The lower limit of the content of the VLDPE in 100 parts by mass of the resin component of the inner sheath layer 3a is 20 parts by mass, preferably 40 parts by mass, and more preferably 50 parts by mass. If the content of the VLDPE is below the lower limit, the flexibility of the cable 1 may be insufficient. On the other hand, the upper limit of the content of the VLDPE is not particularly limited, and is 100 parts by mass, but is preferably 90 parts by mass in order to include the non-crosslinked resin, which will be described later.

The upper limit of the specific gravity of the VLDPE is preferably 0.90, and is more preferably 0.87. If the upper limit of the specific gravity of the VLDPE exceeds the upper limit, the flexibility of the inner sheath layer 3a is liable to be insufficient, resulting in insufficient flexibility of the cable 1. The lower limit of the specific gravity of the VLDPE can be, for example, 0.82 in order to ensure sufficient mechanical strength.

When crosslinking is silane crosslinking, the lower limit of the silicon atom content in the VLDPE of the inner sheath layer 3a is preferably 0.05 mass %, and more preferably 0.1 mass %. On the other hand, the upper limit of the content of the silicon atom is preferably 10 mass %, more preferably 5 mass %, further preferably 1 mass %, and particularly preferably 0.5 mass %. If the silicon atom content is less than the lower limit, the heat resistance improvement effect of the silane crosslinking of the cable 1 is liable to be insufficient. Conversely, if the content of the silicon atoms exceeds the upper limit, the flexibility of the inner sheath layer 3a may decrease due to the hardening by the silane crosslinking group. On the other hand, because the crosslinking is silane crosslinking and the silicon atom content in the VLDPE is within the above-described range, the VLDPE has a reticulated polymeric structure in which the silane crosslinking group contacts and reacts with water. Because the inner sheath layer 3a is made more heat resistant by this silane crosslinked polymeric structure, at least the inner sheath layer 3a does not have to be crosslinked using an electron beam in the cable 1. Thus, the cost of electron beam irradiation can be reduced because the cable 1 requires no electron beam apparatus or only a low power electron beam apparatus that can crosslink the outer sheath layer 3b during manufacturing. Accordingly, the cable 1 has a relatively low manufacturing cost even when the thickness of the sheath layer 3 is great.

The lower limit of the content of silicon atoms in the inner sheath layer 3a is preferably 0.01 mass %, and more preferably 0.05 mass %. Meanwhile, the upper limit of the content of silicon atoms in the inner sheath layer 3a is preferably 10 mass %, more preferably 5 mass %, further preferably 1 mass %, and particularly preferably 0.5 mass %. If the above-mentioned content is less than the lower limit, the silane crosslinking may be insufficient and the heat resistance of the cable 1 is liable to insufficiently improve. Conversely, if the above-described content exceeds the upper limit, the flexibility of the inner sheath layer 3a may decrease due to the hardening by the silane crosslinking group.

The upper limit of the modulus of elasticity of the inner sheath layer 3a at 25 degrees C. is 30 MPa, and is preferably 25 MPa. If the elastic modulus exceeds the upper limit, the flexibility of the inner sheath layer 3a is insufficient, and the flexibility of the cable 1 may be insufficient. Meanwhile, the lower limit of the elastic modulus is 5 MPa, and is preferably 10 MPa. If the aforementioned elastic modulus is less than the aforementioned lower limit, the heat resistance is liable to be insufficient.

The lower limit of the elastic modulus of the inner sheath layer 3a at 150 degrees C. is preferably 0.1 MPa, and is more preferably 0.2 MPa. If the elastic modulus is less than the lower limit, the heat resistance of the inner sheath layer 3a is insufficient, and the heat resistance of the cable is liable to be insufficient. Meanwhile, the upper limit of the elastic modulus is not particularly limited, but can be, for example, 0.8 MPa from the viewpoint of flexibility.

The inner sheath layer 3a preferably contains a non-crosslinked resin. By incorporating a relatively inexpensive non-crosslinked resin in the inner sheath layer 3a, the manufacturing cost of the cable 1 can be further reduced. Examples of the above-described non-crosslinked resin include polyethylene (PE), polypropylene (PP), polyvinyl chloride (PVC), and a copolymer of ethylene and a vinyl monomer containing an ester bond. These non-crosslinked resins may be used alone or in mixtures of two or more types. Here, the "non-crosslinked resin" indicates resin that is not crosslinked.

Among them, the non-crosslinked resin may be a copolymer of ethylene and a vinyl monomer containing an ester bond. The copolymer is relatively inexpensive and highly adhesive to polyurethane, which is a major component of the outer sheath layer 3b. Therefore, the non-crosslinked resin can further reduce the manufacturing cost of the cable 1 and can further make it difficult for the outer sheath layer 3b to peel from the inner sheath layer 3a. Examples of such copolymers include ethylene-vinyl acetate copolymer, ethylene-methyl acrylate copolymer, ethylene-ethyl acrylate copolymer, ethylene-butyl acrylate copolymer, ethylene-methyl methacrylate copolymer, ethylene-ethyl methacrylate copolymer, ethylene-butyl methacrylate copolymer, and the like.

When the inner sheath layer 3a contains a non-crosslinked resin, the lower limit of the content of the non-crosslinked resin in 100 parts by mass of the resin component in the inner sheath layer 3a is preferably 10 parts by mass and more preferably 20 parts by mass. On the other hand, the upper limit of the content of the above-described non-crosslinked resin is preferably 80 parts by mass and more preferably 60 parts by mass. If the content of the above-described non-crosslinked resin is less than the lower limit, the manufacturing cost reduction effect of the cable 1 by using the non-crosslinked resin is liable to be insufficient. Conversely, if the content of the above-described non-crosslinked resin exceeds the upper limit, a silane crosslinked VLDPE is relatively insufficient, and the heat resistance improvement effect of the silane crosslinking of the cable 1 is liable to be insufficient.

The average outer diameter of the inner sheath layer 3a is appropriately determined to cover the two core members 2, but the lower limit of the average outer diameter of the inner sheath layer 3a is preferably 3 mm and more preferably 3.4 mm. Meanwhile, the upper limit of the average outer diameter of the inner sheath layer 3a is preferably 12 mm and more preferably 11 mm. If the average outer diameter of the inner sheath layer 3a is less than the lower limit, the heat resistance improvement effect of the silane crosslinking of the cable 1 is liable to be insufficient. Conversely, if the average outer diameter of the inner sheath layer 3a exceeds the upper limit, because the cable 1 is unnecessarily thick, the flexibility of the cable 1 is liable to decrease.

The inner sheath layer 3a is coated with two core members 2 contacting with each other, so that the wall thickness is usually non-uniform. The lower limit of the average minimum wall thickness of the inner sheath layer 3a is preferably 0.3 mm and more preferably 0.45 mm. On the other hand, the upper limit of the average minimum thickness of the inner sheath layer 3a is preferably 3 mm and more preferably 2.5 mm. If the average minimum thickness of the inner sheath layer 3a is less than the lower limit, the heat resistance improvement effect due to the silane crosslinking of the cable 1 may not be sufficient. Conversely, if the average minimum wall thickness of the inner sheath layer 3a exceeds the upper limit, because the cable 1 is unnecessarily thickened, the flexibility of the cable 1 is liable to decrease. The "average minimum thickness" of the inner sheath layer refers to a value obtained by averaging the length of the minimum distance between any point on the outer circumference of the inner sheath layer and any point on the outer circumference of the core member.

The inner sheath layer 3a preferably includes a catalyst to facilitate crosslinking. Such catalysts include metal carboxylates such as tin, zinc, iron, lead, cobalt, barium, calcium and the like, titanate, organic bases, inorganic acids, organic acids and the like. As a lower limit of the catalyst content with respect to 100 parts by mass of resin of the inner sheath layer 3a, 0.01 parts by mass is preferable, and 0.03 parts by mass is more preferable. On the other hand, the upper limit of the content of the catalyst is preferably 0.15 parts by mass and 0.12 parts by mass. If the catalyst content is less than the lower limit, the VLDPE crosslinking of the inner sheath layer 3a may not proceed sufficiently. Conversely, if the catalyst content exceeds the upper limit, the crosslinked VLDPE may be relatively insufficient, and the heat resistance improvement effect of the cable 1 is liable to be insufficient.

The inner sheath layer 3a may optionally contain an additive such as a heat-resistant antioxidant or a flame retardant, if necessary. The heat-resistant antioxidant and the flame retardant described above may be the same as that of the insulating coating layer 2b. The content of the additive in the inner sheath layer 3a is determined so that the additive effect is expressed while maintaining the heat resistance improvement effect of the crosslinked VLDPE. The content can be 0.1 to 15 parts by mass or more for 100 parts by mass of the resin.

(Outer Sheath Layer)

The main component of the outer sheath layer 3b is polyurethane (PU). Among them, thermoplastic polyurethane having excellent flexibility is preferable.

Also, the polyurethane may be electron beam crosslinked polyurethane, but may be an allophanate crosslinked polyurethane. As described above, the polyurethane of the outer sheath layer 3b is allophanate crosslinked polyurethane, thereby further increasing the strength of the outer sheath layer 3b and increasing the strength of the cable 1. Furthermore, because the electron beam crosslinking to the outer sheath layer 3b is not required, when the inner sheath layer 3a is a silane crosslinked VLDPE, the electron beam apparatus forcrosslinking the sheath layer 3 is not required. This further reduces the manufacturing cost of the cable 1.

Here, the allophanate-crosslinked polyurethane can be manufactured by using a resin composition for an outer sheath layer, such as a compound in which a polyhydric isocyanate compound, for example, diphenylmethane diisocyanate, dicyclohexane diisocyanate, is added to the base resin of the polyurethane, or an allophanate crosslinkable polymer in which an isocyanate group is included in the base resin of the polyurethane. On this occasion, the lower limit of the content of the polyisocyanate compound is preferably 2 parts by mass with respect to 100 parts by mass of the resin component constituting the outer sheath layer 3b, and is more preferably 4 parts by mass. On the other hand, the upper limit of the content of the polyisocyanate compound is preferably 15 parts by mass, and is more preferably 12 parts by mass.

The lower limit of the content of polyurethane in 100 parts by mass of the resin component in the outer sheath layer 3b is preferably 50 parts by mass, more preferably 80 parts by mass, and further preferably 90 parts by mass. If the polyurethane content is less than the lower limit, the bonding strength between the inner sheath layer 3a and the outer sheath layer 3b is liable to be insufficient. On the other hand, the upper limit of the content of the polyurethane is not particularly limited, and can be 100 parts by mass.

The lower limit of the average thickness of the outer sheath layer 3b is preferably 0.2 mm and more preferably 0.3 mm. On the other hand, the upper limit of the average thickness of the outer sheath layer 3b is preferably 0.7 mm and more preferably 0.6 mm. If the average thickness of the outer sheath layer 3b is less than the lower limit, the strength of the cable 1 is liable to be insufficient. Conversely, if the average thickness of the outer sheath layer 3b exceeds the upper limit, because the cable 1 is unnecessarily thick, the flexibility of the cable 1 is liable to decrease. Further, when the outer sheath layer 3b is electron beam crosslinked polyurethane, a high-power electron beam apparatus is required for the electron beam crosslinking of the outer sheath layer 3b, and the manufacturing cost reduction effect of the cable 1 is liable to be insufficient.

The outer sheath layer 3b may optionally contain an additive such as a heat-resistant antioxidant or a flame retardant, if necessary. The heat-resistant antioxidant and the flame retardant described above may be the same as those of the insulating coating layer 2b.

The lower limit of the average outer diameter of the cable 1 is preferably 3.5 mm and more preferably 4 mm. On the other hand, the upper limit of the average outer diameter of the cable 1 is preferably 13 mm and more preferably 12 mm. If the average outer diameter of the cable 1 is less than the lower limit, the thickness of the sheath layer 3 is insufficient, and the insulation of the cable 1 is liable to be insufficient. Conversely, if the average outer diameter of the cable 1 exceeds the upper limit, because the cable 1 becomes unnecessarily thick, the flexibility of the cable 1 is liable to decrease.

The lower limit of the adhesion strength by the 90 degree peel test between the inner sheath layer 3a and the outer sheath layer 3b of the cable 1 is preferably 2.5 N/cm, and more preferably 3.5 N/cm. If the above-described adhesion strength is less than the above-described lower limit, the outer sheath layer 3b may peel from the inner sheath layer 3a when the cable 1 is used. On the other hand, the upper limit of the above-described bonding strength is not particularly limited, but is normally about 15 N/cm. As described above, the "bond strength by 90 degree peel test" is the value measured according to the 90 degree peel test described in JIS-K-6854 (1999).

<Cable Manufacturing Method>

The cable 1 can be manufactured by a manufacturing method including, for example, a step of preparing a resin composition for forming a sheath layer 3, and a step of extruding the resin composition.

(Resin Composition Preparing Process)

In the resin composition preparing step, an inner sheath layer resin composition for forming the inner sheath layer 3a and an outer sheath layer resin composition for forming the outer sheath layer 3b are prepared.

When silane crosslinking is performed on the inner sheath layer 3a, for example, a compound in which a silane compound is added to the base resin of VLDPE, a silane crosslinking polymer in which an active silane group is included in the base resin of VLDPE or the like, can be used as the resin composition for the inner sheath layer. Also, an additive such as a catalyst and a heat-resistant antioxidant may be added to facilitate a crosslinking reaction. When forming an inner sheath layer 3a containing a non-crosslinked resin, a non-crosslinked resin is further added to the resin composition for the inner sheath layer. The resin composition for the inner sheath layer may be melt and kneaded, for example, by an open roll mixer, a pressurized needle, Banbury mixer, a twin screw extruder or the like, and may be formed into a pellet, for example.

Examples of the silane compound include alkoxysilane, vinyltrimethoxysilane, vinyltriethoxysilane and the like.

Also, the above-described silane crosslinkable polymer can be prepared, for example, by adding a silane compound to a base resin of VLDPE and stirring the VLDPE at room temperature with a super mixer or the like, and then kneading the stirred VLDPE by a pressurized nider, Banbury mixer, or a twin-shaft or single-screw extruder while heating the VLDPE to a melting point of the VLDPE or more. This grafts the silane compound to the base resin to provide a silane crosslinkable polymer.

To facilitate grafting of the silane compound, a radical generating agent may be added with the silane compound. Examples of the radical generating agent include a dicumyl peroxide, α,α'-bis(t-butylperoxyisopropyl)benzene, di-t-butylperoxide, t-butylkumyl peroxide, di-benzoyl peroxide, 2,5-dimethyl-2,5-bis(t-butylperoxy)hexane, t-butylperoxypivalate, t-butylperoxy-2-ethylhexanoate and the like.

The lower limit of the content of the radical generating agent for 100 parts by mass of the base resin is preferably 0.02 parts by mass, and more preferably 0.05 parts by mass. On the other hand, the upper limit of the content of the radical generating agent is preferably 0.15 parts by mass and more preferably 0.12 parts by mass. If the content of the radical generating agent is less than the lower limit, the silane graft is liable to be insufficient. Conversely, if the content of the radical generating agent exceeds the upper limit, the workability of the inner sheath layer 3a is liable to decrease, or a localized graft is liable to occur, resulting in deterioration of the appearance when the inner sheath layer 3a is molded.

On the other hand, when electron beam crosslinking is performed on the inner sheath layer 3a, the resin composition for the inner sheath layer is, for example, a base resin of VLDPE, and if necessary, an additive such as a heat-resistant antioxidant, or a composition in which a non-crosslinked resin is added, is used.

Moreover, the resin composition for the outer sheath layer can be a composition including, for example, polyurethane. An additive, such as a heat-resistant antioxidant, may be included in the composition.

Here, when the outer sheath layer 3b is crosslinked with an allophanate, for example, a compound in which a polyhydric isocyanate compound such as diphenylmethane diisocyanate or dicyclohexane diisocyanate is added to the base resin of the polyurethane, or an allophanate crosslinkable polymer in which an isocyanate group is included in the base resin of the polyurethane, may be used as the resin composition for the outer sheath layer. Also, a catalyst may be added to facilitate the crosslinking reaction. Incidentally, the allophanate crosslinkable polymer can be produced using a polyurethane base resin and a polyisocyanate compound in the same manner as the silane crosslinkable polymer.

(Extrusion Molding Process)

In an extrusion molding process, for example, the resin composition for the inner sheath layer and the resin composition for the outer sheath layer are extruded around the two twisted core members 2 so that the resin composition for the outer sheath layer is disposed on the outer side.

A known melt extruder can be used for extrusion molding. Also, the extrusion may be performed by extruding the inner sheath layer resin composition around the core member 2, and then extruding the outer sheath layer resin composition around the inner sheath layer, or performed by simultaneously extruding the inner sheath layer resin composition and the outer sheath layer resin composition so that the outer sheath layer resin composition is disposed on the outer side.

After the extrusion, the sheath layer 3 is crosslinked. Incidentally, when the silane crosslinking is performed on the inner sheath layer 3a, the crosslinking treatment can be performed by leaving the sheath layer 3 at room temperature. However, in order to shorten the process, the crosslinking treatment can be performed while using water, water vapor, or the like. The water crosslinking is carried out in a high humidity bath, for example, at a temperature of 50 degrees C. to 100 degrees C. and a relative humidity of 85% to 95% for 24 hours or more.

In addition, when a silane crosslinking is performed on the inner sheath layer 3a, electron beam irradiation is not preferably performed on the sheath layer 3. The heat resistance of the cable 1 is improved by a silane crosslinked VLDPE without electron beam irradiation. Therefore, the elimination of electron beam irradiation eliminates the need for an electron beam apparatus to crosslink the sheath layer 3, thereby further reducing the manufacturing cost of the cable 1.

<Advantages>

The cable 1 is highly heat resistant because the inner sheath layer 3a contains a crosslinked very low density polyethylene. In addition, the cable 1 is highly flexible because the content of the very low density polyethylene in 100 parts by mass of the resin component of the inner sheath layer 3a is within the above-described range. The cable 1 has polyurethane as the main component of the outer sheath layer 3b. Because the polyurethane and the very low density polyethylene are easily adhered to each other and because the bonding strength between the inner sheath layer 3a and the outer sheath layer 3b is easily secured, the inner sheath layer 3a and the outer sheath layer 3b in the cable 1 are unlikely to peel off from each other. Moreover, because the polyurethane-based component increases the mechanical strength, the cable 1 is sufficiently strong. In addition, the cable 1 can be sufficiently flexible and heat resistant by setting the elastic modulus of the inner sheath layer 3a at 25 degrees C. within the aforementioned range.

The cable 1 is suitable for electromechanical parking brakes in automobiles because of its strong, flexible, and heat resistant properties as described above.

Second Embodiment

Figure 2:
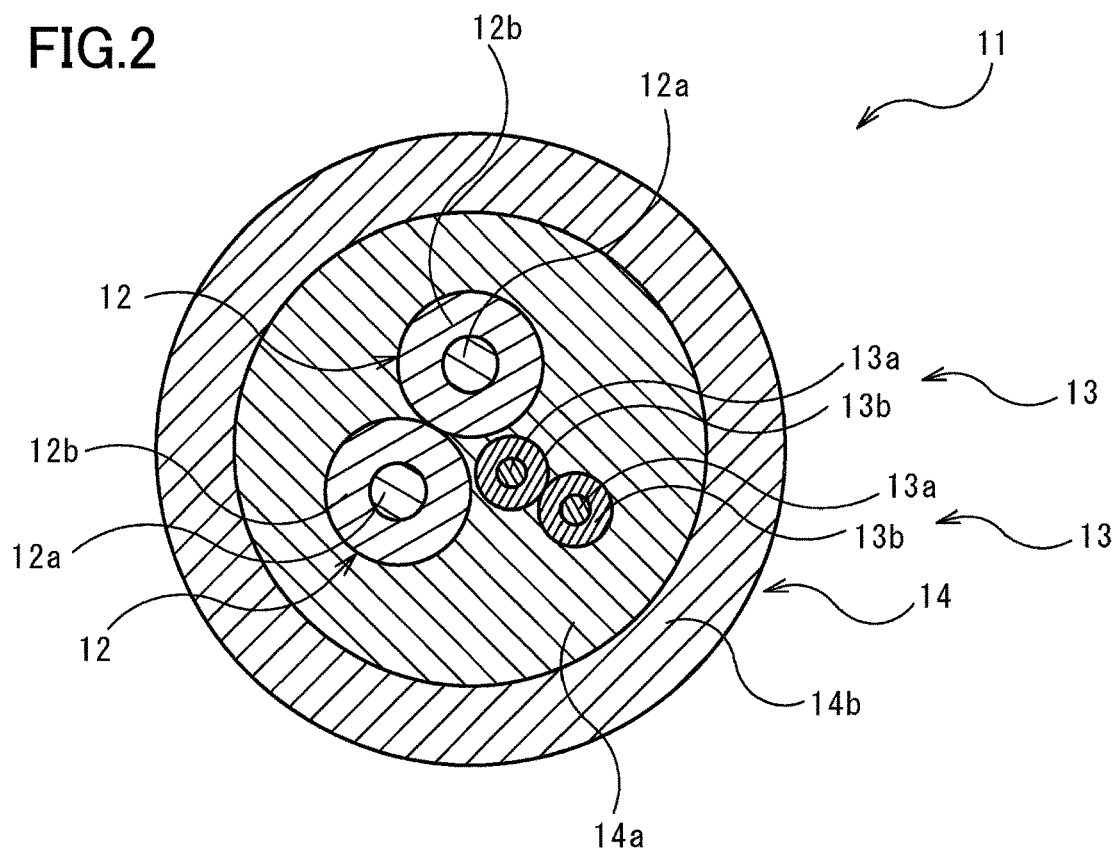
FIG. 2 is a schematic cross-sectional view of a cable according to a different embodiment from the cable of FIG. 1.

The cable 11 shown in FIG. 2 includes two first core members 12 including a first conductor 12a and a first insulating coating layer 12b covering the first conductor 12a, two second core members 13 including a second conductor 13a and a second insulating coating layer 13b covering the second conductor 13a, and a sheath layer 14 covering the two first core members 12 and the two second core members 13. The two first core members 12 are formed to have the same diameter, and the two second core members 13 are formed to have the same diameter. Also, the diameter of the first core members 12 is greater than the diameter of the second core members 13. The two first core members 12 and the two second core members 13 may be arranged in parallel, but may be preferably arranged while being twisted together. The cable 11 is preferably arranged by twisting, for example, the two first core members 12 and a single twisted core wire formed by twisting the two second core members 13. The first core members 12 can be configured in the same manner as the core members 2 of FIG. 1. The second core members 13 can be configured in the same manner as the core members 2 shown in FIG. 1 except that the average outer diameter of the second conductors 13a, and the average thickness of the second insulating coating layers 13b, differ from those of the core members 2. The cable 11 is suitable for use in electromechanical parking brake applications as well as use in transmitting electrical signals that control ABS (Anti-lock Brake System) operation. If the cable 11 is used as an electromechanical parking brake and an ABS signal cable, a twisted core wire twisted around the second core members 13 transmits an ABS signal.

The sheath layer 14 includes an inner sheath layer 14a, and an outer sheath layer 14b, covering the inner sheath layer 14a. The sheath layer 14 may be similar in configuration to the sheath layer 3 of FIG. 1. That is, the cable 11 may have the same configuration as the cable 1 of FIG. 1 except that the cable 11 includes the two second core members 13.

<Advantages>

The cable 11 can transmit electrical signals for an ABS as well as electrical signals for an electromechanical parking brake mounted on a vehicle.

Other Embodiments

It should be understood that the embodiments disclosed herein are exemplary in all respects and are not restrictive. The scope of the present disclosure is not limited to the construction of the embodiments described above, but is set forth by the appended claims, and is intended to include all modifications within the meaning and scope of the claims and equivalents.

In the above embodiment, two core members are described, but one or more than two core members may be used.

Also, the cable may include other layers between the core member and the sheath layer or around the outer periphery of the sheath layer. Other layers disposed between the core member and the sheath layer include, for example, a paper tape layer to facilitate the removal of the core member from the cable. Other layers disposed on the outer periphery of the sheath layer include, for example, a shielding layer.

In the above-described embodiment, as a method of manufacturing the cable, extrusion molding is performed and then a crosslinking treatment is performed, but extrusion molding may be performed after the crosslinking treatment is performed on the resin composition.

In addition, in the above-described embodiment, a case in which the resin composition for the inner sheath layer that is melt and kneaded with a non-crosslinked resin is loaded into an extruder is described. However, the non-crosslinked resin may be mixed during extrusion molding. Specifically, the resin composition for the inner sheath layer and the non-crosslinked resin may be formed into pellets, and these pellets may be injected into an extruder and then extruded while being mixed with the non-crosslinked resin.

The cable is not limited to the cable used for automotive electrical wiring, and may be used, for example, as a cable for automotive electrical power supply or a cable for a heat-resistant electronic device.

EXAMPLE

The present disclosure will be described in further detail in the following examples, but the present disclosure is not limited to the following examples.

[No. 1]

First, a VLDPE with a specific gravity of 0.870 as a base resin ("engagement 8100" of Dow Inc.) and an alkoxysilane as a silane compound ("KBM1003" of Shin-Etsu Silicone) were mixed so that the silicon atom content (Si content) in the VLDPE was 0.2 mass %. The content of silicon atoms was measured by EDX analysis using the EDX-HS series manufactured by Shimadzu Corporation with an acceleration voltage of 15 kV and an analysis area of 0.1*0.1 mm. The 100 parts by mass of the mixture and 1 part by mass of dicumyl peroxide ("Parkmill D" of Nippon Oil & Fats Co., Ltd) as a radical generating agent were injected into a super-mixer, and was stirred by rotating a rotor at 60 rpm at room temperature. Next, the stirred mixture was injected into a pressurized needler with a mixing capacity of 3 L and the rotor was rotated at 30 rpm to melt and knead the mixture at a starting temperature of 100 degrees C. and a kneading temperature of 200 degrees Caa to obtain a VLDPE containing silane crosslinking groups.

A resin composition for the inner sheath layer was prepared by a mixture of the above silane crosslinked VLDPE, non-crosslinked EVA (Evaflex EV360 of Mitsui DuPont Polychemical Co., Ltd.), an antioxidant (Irganox 1010 of BASF Co., Ltd.), and a catalyst (dioctyltin) as shown in Table 1.

Ether-based polyurethane ("ET385-50" of BASF Co., Ltd.) was prepared as a resin composition for the outer sheath layer. The polyurethane is polyurethane that does not contain an allophanate crosslinking group.

The resin composition for the inner sheath layer and the resin composition for the outer sheath layer were extruded simultaneously around the two twisted core members (conductor diameter 2.4 mm, insulating coating layer thickness 0.3 mm) so that the resin composition for the outer sheath layer was disposed on the outer side. In the extrusion molding, a mold such that an average outer diameter of the cable became 8.3 mm and that an average thickness of the outer sheath layer became 0.5 mm was used. After the above extrusion molding, a crosslinking treatment was performed in a high-humidity bath at a temperature of 60 degrees C. and a relative humidity of 90% for 24 hours, and a cable No. 1 was obtained.

[No. 2 to No. 4 and No. 8]

In the resin composition for the inner sheath layer of No. 1, the cables No. 2 to No. 4 and No. 8 were obtained in the same manner as No. 1 except that the compositions of the VLDPE containing silane crosslinking groups and the EVA of non-crosslinking groups were made as shown in Table 1.

[No. 5]

As the resin composition for the outer sheath layer, 20 parts by mass of a polyurethane containing a polyisocyanate compound ("Crossnate EM-30" of Dainichi Seika Kogyo Co., Ltd., and a polyurethane containing a polyisocyanate compound of 30 mass % or more and 40 mass % or less) was mixed with 100 parts by mass of the polyurethane of No. 2, and a polyurethane containing an allophanate crosslinking group was prepared. Incidentally, the content of the polyisocyanate compound after the mixture is not less than 5 parts by mass and not more than 6.6 parts by mass with respect to 100 parts by mass of the resin component constituting the outer sheath layer. A cable No. 5 was obtained in the same manner as No. 2 except that the above-described resin composition for the outer sheath layer was used.

[No. 6]

A VLDPE with a specific gravity of 0.870 as a base resin ("Engage 8100" of Dow Inc.) and an alkoxysilane as a silane compound ("KBM1003" of Shin-Etsu Silicone) were mixed so that the silicon atom content (Si content) in the VLDPE was 0.7 mass %. A cable No. 6 was obtained in the same manner as No. 2, except that this mixture was used.

[No. 7]

The composition shown in Table 1 was prepared by mixing a non-crosslinked EVA ("Evaflex EV360" of Mitsui DuPont Polychemical) and an antioxidant (Irganox 1010 of BASF Co., Ltd.) as the resin composition for the inner sheath layer.

Extrusion molding was performed in the same manner as No. 1 except that the resin composition for the inner sheath layer was used. After extrusion molding, a crosslinking treatment was performed by electron beam irradiation of 180 kGy to obtain a No. 7 cable.

[No. 9, No. 10]

In the VLDPE containing the silane crosslinking group, cables No. 9 and No. 10 were obtained in the same manner as No. 1 except that the VLDPE as the base resin and alkoxysilane as the silane compound were mixed so that the Si content becomes the value as shown in Table 1.

[No. 11]

A low density polyethylene (LDPE, Low Density Polyethylene; Novatec LF280H of Japan Polyethylene Co., Ltd.) as a base resin and an alkoxysilane (KBM1003 of Shin-Etsu Silicone Co., Ltd.) as a silane compound were mixed to have a Si content of 0.2 mass %. The mixture was melt and kneaded under the same conditions as No. 2 to give a silane crosslinked LDPE. The "low density polyethylene" means a polyethylene having a specific gravity more than 0.9 and not more than 0.93.

The cable No. 11 was obtained in the same manner as No. 2 except that the above-described LDPE containing the silane crosslinking group was used.

[No. 12]

In the resin composition for the inner sheath layer of No. 11, the cables of No. 12 was obtained in the same manner as No. 11, except that the composition of the silane crosslinked LDPE and the non-crosslinked EVA was made as shown in Table 1.

[No. 13]

EVA (Suntec EF1531 of Asahi Kasei Corporation) with a specific gravity of 0.936 as a base resin and an alkoxysilane (KBM1003 of Shin-Etsu Silicone) as a silane compound were mixed so that the Si content became 0.2 mass %. The mixture was melt and kneaded under the same conditions as No. 2 to obtain EVA containing silane crosslinking groups.

The cable No. 13 was obtained in the same manner as No. 2 except that the above-described EVA containing the silane crosslinking group was used.

[No. 14]

In the resin composition for the inner sheath layer of No. 13, a cable No. 14 was obtained in the same manner as No.

13, except that the composition of the EVA containing the silane crosslinked group and the EVA of the non-crosslinked group were shown in Table 1.

[No. 15 to No. 22]

A VLDPE with a specific gravity of 0.870 as a base resin ("Engage 8100" of Dow Inc.) and an alkoxysilane as a silane compound (Shin-Etsu Silicone's KBM1003) were mixed so that the silicon atom content (Si content) in the VLDPE became as shown in Table 2. This mixture was used to obtain cables No. 15 to No. 22 in the same manner as No. 1 except that the composition of the VLDPE and the non-crosslinked EVA was shown in Table 2.

[No. 23 to No. 26]

As the resin composition for the inner sheath layer, the composition shown in Table 2 was prepared by mixing a non-crosslinked EVA ("Evaflex EV360" of Mitsui DuPont Polychemical Co., Ltd.) and an antioxidant ("Irganox 1010" of BASF Co., Ltd.) with the VLDPE ("Engage 8100" of Dow Inc.) having a specific gravity of 0.870 as the base resin. Extrusion molding was performed in the same manner as No. 1 except that the above-described mixture was used. After the above-described extrusion molding, a crosslinking treatment was performed by electron beam irradiation at the radiation dose shown in Table 2, and cables No. 23 to No. 26 were obtained.

[Evaluation Method]

The bonding strength between the inner sheath layer and the outer sheath layer and the modulus of elasticity of the inner sheath layer at 25 degrees C. and 150 degrees C. were measured for the cables No. 1 to No. 26. The results are shown in Tables 1 and 2.

(Adhesion Strength)

Adhesion strength was measured according to the 90 degree test described in JIS-K-6854 (1999). In addition, when the adhesion strength is 2.5 N/cm or more, the adhesion strength between the inner sheath layer and the outer sheath layer was determined to be high.

(Elastic Modulus)

The moduli of elasticity at 25 degrees C. and 150 degrees C. were measured by dynamic viscoelasticity measurement (tensile method) at 25 degrees C. and 150 degrees C. The measurement frequency in the above measurement was made 10 Hz, and the distortion in the above measurement was made 0.08%. When the elastic modulus was 30 MPa or less at 25 degrees C., the flexibility of the cable was considered to be excellent. In addition, when the elastic modulus was 0.1 MPa or more at 150 degrees C., it was determined that the cable was unlikely to thermally deform and exceled in heat resistance.

TABLE 1

| | | Si CONTENT (mass %) | No. 1 | No. 2 | No. 3 | No. 4 | No. 5 | No. 6 | No. 7 |
|---|---|---|---|---|---|---|---|---|---|
| INNER SHEATH LAYER COMPO- SITION (PARTS BY MASS) | VLDPE CONTAINING SILANE CROSS- LINKING GROUP | 0.2 | 20 | 50 | 80 | 100 | 50 | — | — |
| | VLDPE CONTAINING SILANE CROSS- LINKING GROUP | 0.7 | — | — | — | — | — | 50 | — |
| | VLDPE CONTAINING SILANE CROSS- LINKING GROUP | 1.1 | — | — | — | — | — | — | — |
| | VLDPE CONTAINING SILANE CROSS- LINKING GROUP | 0.04 | — | — | — | — | — | — | — |
| | LDPE CONTAINING SILANE CROSS- LINKING GROUP | 0.2 | — | — | — | — | — | — | — |
| | EVA CONTAINING SILANE CROSS- LINKING GROUP | 0.2 | — | — | — | — | — | — | — |
| | EVA | | 80 | 50 | 20 | — | 50 | 50 | 100 |
| | ANTIOXIDANT | | 1 | 1 | 1 | 1 | 1 | 1 | 1 |
| | CATALYST | | 0.1 | 0.1 | 0.1 | 0.1 | 0.1 | 0.1 | — |
| OUTER SHEATH LAYER | ALLOPHANATE CROSSLINKING | | NO | NO | NO | NO | YES | NO | NO |
| | ELECTRON BEAM IRRADIATION | | — | — | — | — | — | — | 180 kGy |
| | Si CONTENT OF INNER SHEATH LAYER (mass %) | | 0.04 | 0.1 | 0.16 | 0.2 | 0.1 | 0.35 | — |
| EVALU- ATION RESULT | ADHESION STRENGTH | (N/cm) | 4.9 | 5.5 | 3.8 | 3.0 | 5.6 | 5.3 | 5.3 |
| | ELASTIC MODULUS AT 25° C. | (MPa) | 21 | 20 | 14 | 10 | 20 | 29 | 35 |
| | ELASTIC MODULUS AT 150° C. | (MPa) | 0.2 | 0.3 | 0.5 | 0.6 | 0.2 | 0.6 | 1.7 |

| | | Si CONTENT (mass %) | No. 8 | No. 9 | No. 10 | No. 11 | No. 12 | No. 13 | No. 14 |
|---|---|---|---|---|---|---|---|---|---|
| INNER SHEATH LAYER COMPO- SITION | VLDPE CONTAINING SILANE CROSS- LINKING GROUP | 0.2 | 10 | — | — | — | — | — | — |
| | VLDPE CONTAINING SILANE CROSS- | 0.7 | — | — | — | — | — | — | — |

TABLE 1-continued

| | | Si CONTENT (mass %) | No. 8 | No. 9 | No. 10 | No. 11 | No. 12 | No. 13 | No. 14 |
|---|---|---|---|---|---|---|---|---|---|
| (PARTS BY MASS) | VLDPE CONTAINING SILANE CROSS-LINKING GROUP | 1.1 | — | 50 | — | — | — | — | — |
| | VLDPE CONTAINING SILANE CROSS-LINKING GROUP | 0.04 | — | — | 50 | — | — | — | — |
| | LDPE CONTAINING SILANE CROSS-LINKING GROUP | 0.2 | — | — | — | 50 | 100 | — | — |
| | EVA CONTAINING SILANE CROSS-LINKING GROUP | 0.2 | — | — | — | — | — | 50 | 100 |
| | EVA | | 90 | 50 | 50 | 50 | — | 50 | — |
| | ANTIOXIDANT | | 1 | 1 | 1 | 1 | 1 | 1 | 1 |
| | CATALYST | | 0.1 | 0.1 | 0.1 | 0.1 | 0.1 | 0.1 | 0.1 |
| OUTER SHEATH LAYER | ALLOPHANATE CROSSLINKING | | NO | NO | NO | NO | NO | NO | NO |
| | ELECTRON BEAM IRRADIATION | | — | — | — | — | — | — | — |
| | Si CONTENT OF INNER SHEATH LAYER (mass %) | | 0.02 | 0.55 | 0.02 | 0.1 | 0.2 | 0.1 | 0.2 |
| EVALUATION RESULT | ADHESION STRENGTH (N/cm) | | 5.0 | 5.1 | 4.8 | 0.5 | 0.2 | 1.8 | 1.0 |
| | ELASTIC MODULUS AT 25° C. (MPa) | | 25 | 50 | 15 | 290 | 500 | 60 | 93 |
| | ELASTIC MODULUS AT 150° C. (MPa) | | — | 1.0 | — | 0.6 | 0.9 | 0.3 | 0.6 |

TABLE 2

| | | Si CONTENT (mass %) | No. 15 | No. 16 | No. 17 | No. 18 | No. 19 | No. 20 | No. 21 | No. 22 | No. 23 | No. 24 | No. 25 | No. 26 |
|---|---|---|---|---|---|---|---|---|---|---|---|---|---|---|
| INNER SHEATH LAYER COMPOSITION (PARTS BY MASS) | VLDPE CONTAINING SILANE CROSS-LINKING GROUP | 5 | 20 | 50 | 80 | 100 | — | — | — | — | — | — | — | — |
| | VLDPE CONTAINING SILANE CROSS-LINKING GROUP | 10 | — | — | — | — | 20 | 50 | 80 | 100 | — | — | — | — |
| | VLDPE | | — | — | — | — | — | — | — | — | 20 | 50 | 80 | 100 |
| | EVA | | 80 | 50 | 20 | — | 80 | 50 | 20 | — | 80 | 50 | 20 | — |
| | ANTIOXIDANT | | 1 | 1 | 1 | 1 | 1 | 1 | 1 | 1 | 1 | 1 | 1 | 1 |
| | CATALYST | | 0.1 | 0.1 | 0.1 | 0.1 | 0.1 | 0.1 | 0.1 | 0.1 | — | — | — | — |
| OUTER SHEATH LAYER | ALLOPHANATE CROSSLINKING | | NO | NO | NO | NO | NO | NO | NO | NO | NO | NO | NO | NO |
| | ELECTRON BEAM IRRADIATION | | — | — | — | — | — | — | — | — | 180 kGy | 180 kGy | 180 kGy | 180 kGy |
| | Si CONTENT OF INNER SHEATH LAYER (mass %) | | 1 | 2.5 | 4 | 5 | 2 | 5 | 8 | 10 | — | — | — | — |
| EVALUATION RESULT | ADHESION STRENGTH (N/cm) | | 4.9 | 5.5 | 3.8 | 3.5 | 4.5 | 5.0 | 3.0 | 2.8 | 4.9 | 5.5 | 3.8 | 3.0 |
| | ELASTIC MODULUS AT 25° C. (MPa) | | 26 | 25 | 19 | 15 | 29 | 28 | 22 | 18 | 30 | 24 | 17 | 12 |
| | ELASTIC MODULUS AT 150° C. (MPa) | | 0.2 | 0.3 | 0.5 | 0.6 | 0.2 | 0.3 | 0.5 | 0.6 | 0.6 | 0.7 | 0.8 | 0.8 |

Table 1 and Table 2 indicate that "–" in the material column is not included. In the columns for electron beam irradiation, the "–" indicates that electron beam irradiation is not performed. In the column of elastic modulus at 150 degrees C., "–" means that the elastic modulus could not be measured due to excessive softening of the cable by setting the cable to 150 degrees C.

From Tables 1 and 2, the cables No. 1 to No. 6 and No. 15 to No. 26 have high bonding strength, excellent flexibility, and heat resistance.

In contrast, the cable No. 7 has high elastic modulus at 25 degrees C. and 150 degrees C. in the inner sheath layer due to the insufficient VLDPE content in the inner sheath layer. In addition, because a content of silane crosslinked VLDPE in the inner sheath layer of the cable No. 8 is low, the cable No. 8 has poor heat resistance. In addition, the cable No. 9 is less flexible than the cables No. 1 to No. 6 because a content of silicon atoms in the inner sheath layer is relatively high. Because a content of silicon atoms in the inner sheath layer of the cable No. 10 is low, the cable No. 10 is less heat resistant than those of the No. 1 to 6 cables. Also, the cables No. 11 to No. 14 have poor adhesion strength and flexibility because the inner sheath layer does not contain a crosslinked VLDPE.

Furthermore, when comparing No. 2 with No. 6, the cable No. 2, which differs only in the content of silicon atoms in VLDPE, equals the cable No. 6 in heat resistance and adhesion strength, and excels in flexibility. This indicates that the flexibility is likely to improve by making the content of silicon atoms in the VLDPE from 0.1 mass % to 0.5 mass %.

DESCRIPTION OF THE REFERENCE NUMERALS 1,11 cable
2 core member
2a conductors
2b insulating coating layer
3,14 sheath layer
3a14a inner sheath layer
3b14b outer sheath layer
12 first core member
12a first conductor
12b first insulating coating layer
13 second core member
13a second conductor
13b second insulating coating layer

The invention claimed is:

1. A cable, comprising:
one or more core members including a conductor and an insulating coating layer covering the conductor; and
a sheath layer covering the one or more core members,
wherein the sheath layer includes an inner sheath layer and an outer sheath layer that covers and contacts the inner sheath layer,
wherein the inner sheath layer contains a very low density polyethylene that is subject to crosslinking,
wherein the outer sheath layer contains polyurethane as a main component,
wherein a content of the very low density polyethylene in 100 parts by mass of a resin component of the inner sheath layer is 20 parts by mass or more and 100 parts by mass or less,
wherein an elastic modulus of the inner sheath layer at 25 degrees C. is 5 MPa or more and 30 MPa or less,
wherein the inner sheath layer further contains a non-crosslinked resin,
wherein the non-crosslinked resin is an ethylene-vinyl acetate (EVA) copolymer,
wherein adhesive strength by a 90 degree peel test between the inner sheath layer and the outer sheath layer is 2.5 N/cm or more, and
wherein a content of silicon atoms in the inner sheath layer is 0.01 mass % or more and 10 mass % or less.

2. The cable as claimed in claim 1, wherein an elastic modulus of the inner sheath layer at 150 degrees C. is 0.1 MPa or more and 0.8 MPa or less.

3. The cable as claimed in claim 1, wherein a specific gravity of the very low density polyethylene is 0.9 or less.

4. The cable as claimed in claim 1, wherein the crosslinking is silane crosslinking, and a content of silicon atoms in the very low polyethylene is 0.05 mass % or more and 10 mass % or less.

5. The cable as claimed in claim 1, wherein polyurethane of the outer sheath layer is an allophanate crosslinked polyurethane.

6. The cable as claimed in claim 1, wherein the cable is for an electromechanical parking brake.

7. The cable as claimed in claim 1, wherein an average outer diameter of the inner sheath layer is 3 mm or more and 12 mm or less.

8. The cable as claimed in claim 1, wherein an average thickness of the outer sheath layer is 0.2 mm or more and 0.7 mm or less.

9. The cable as claimed in claim 1, wherein a content of polyurethane in 100 parts by mass of a resin component of the outer sheath layer is 50 parts by mass or more and 100 parts by mass or less.

* * * * *